UNITED STATES PATENT OFFICE.

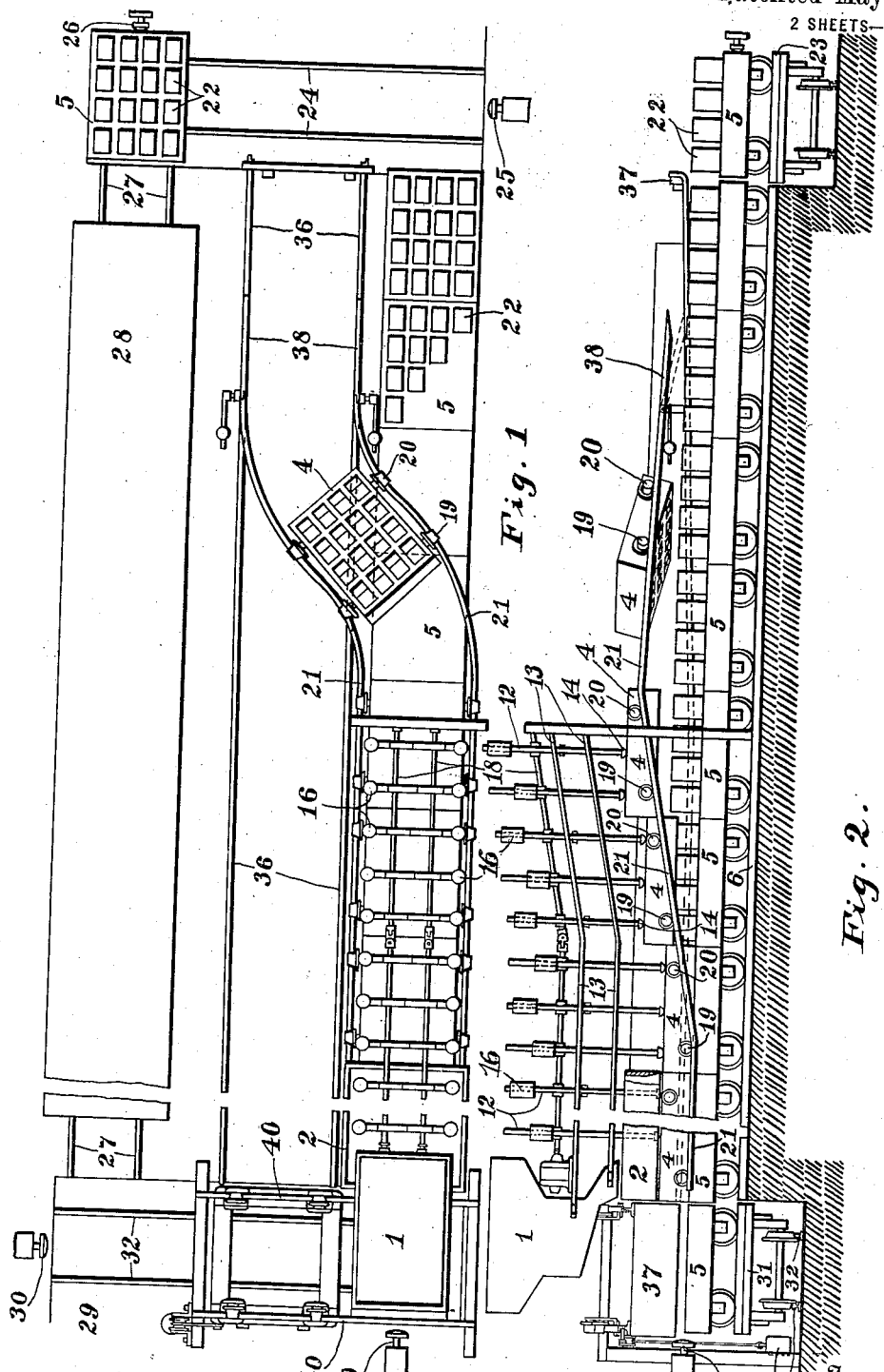

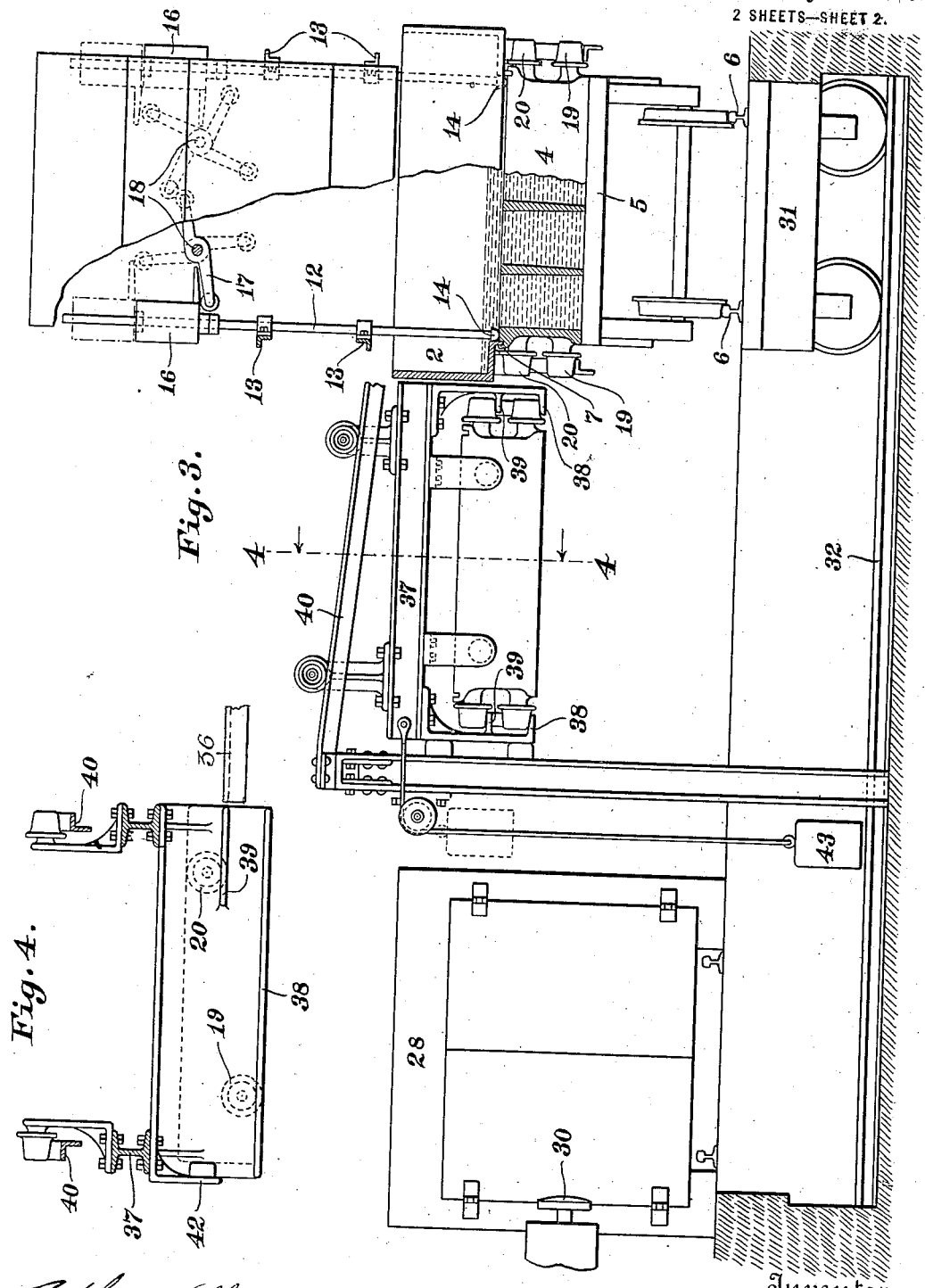

FRED ALLEN JORDAN, OF SELLWOOD, ONTARIO, CANADA, ASSIGNOR TO MOOSE MOUNTAIN, LIMITED, OF SELLWOOD, ONTARIO, CANADA, A CORPORATION OF ONTARIO.

PROCESS OF BRIQUETING.

1,304,186. Specification of Letters Patent. Patented May 20, 1919.

Application filed May 29, 1915. Serial No. 31,117.

*To all whom it may concern:*

Be it known that I, FRED A. JORDAN, a citizen of the United States, residing at Sellwood, in the Province of Ontario and Dominion of Canada, have invented certain new and useful Improvements in Processes of Briqueting, of which the following is a full, clear, and exact specification.

This invention relates to briqueting, and has particular reference to the briqueting of wet concentrates and similar materials preparatory to firing.

The invention comprises improvements upon the invention disclosed in my Patent No. 1,117,853, dated November 17, 1914, whereby the dewatering of the concentrates is hastened and briquets of increased density more rapidly produced.

In said patent, the material is poured into the open mold compartments from a hopper, and principally dewatered in the mold by heat from the kiln car. I have found that the dewatering of the material so that the briquets become self sustaining on the kiln car can be accomplished by tapping or rapping the molds during the period of filling, and after the molds have been filled. I have also discovered that further tapping assists in the separation of the briquets from the mold after they have been dewatered.

According to the present invention, after the material has flowed from a hopper into a mold carried on a kiln car, the mold is subjected to mechanical tapping to accelerate the dewatering of the material in the mold. The kiln car is preferably preheated, as described in my former patent. After the mold is filled, it, and its car, are moved along and the next mold similarly filled, the molds all the while being subjected to mechanical tapping. The cars and molds preferably contact with each other, so that the cars and molds are simultaneously advanced. The tapping is continued during further advance of the molds and cars while the heat from the preheated cars is also effective in dewatering the material and causing the briquets to set. During still further advance of the cars and molds, the tapping is continued, and the molds are at the same time lifted, leaving the briquets on the cars in position for firing. After the molds are fully separated they are returned to the starting point and the cars carrying the briquets are passed through the kiln, discharged, and then returned to the starting point to repeat the process. The invention thus comprises a continuous method whereby briquets are formed in a mold without pressure or binder, and when freed from the mold are in position for firing without having to be displaced or handled in any manner. Furthermore, because the briquets do not have to be handled, they can be made of large size and thereby produced in large quantity at low labor cost.

In the accompanying drawings,

Figure 1 is a plan view of a plant in which the invention is carried out;

Fig. 2 is a side elevation;

Fig. 3 is a rear end elevation, and

Fig. 4 is a detail of a mold transfer device taken on the line 4—4 of Fig. 3.

1 represents a hopper which receives the wet material from the concentrators, mixers, or the like, and discharges it into a filling hopper 2 which is supported on the framework of the machine immediately above the open bottom mold frame 4 carried on the kiln car platform 5. The kiln cars at this time are supported on rails 6. The mold frames 4 are made the same size as kiln car platforms 5, so that the cars and molds contact with each other. The hopper 2 is preferably made to extend over three cars and molds, the hopper and first car being shown broken in Figs. 1 and 2 to save space on the drawing. The lower sides of the hopper 2 have downwardly turned flanges 7 which slide in grooves in the molds 4, or against the sides thereof to prevent leakage of the material outside the mold. The forward end of the hopper is provided with a scraper 8 which smoothes the tops of the briquets as the filled molds pass out from under the hopper 2. The cars and filled molds are moved by a pusher 10, such as a hydraulic piston. While the molds are under the hopper and being filled, the dewatering process is taking place, partly by the heat from the preheated kiln car, and partly by mechanically tapping the molds to cause the particles of material to arrange themselves compactly in the molds. This leaves the excess of water in the hopper above the molds, from which it can either be drained, or else this excess of water may be allowed for in charging the material into the hopper. These tappers consist of vertical rods 12 which are carried by the side frames 13 of the machine and having heads 14 which rest on the sides of the mold frames 14. These tappers could also operate on the mold partitions, if desired. Reciprocating weights or hammers 16 are provided to strike the rods 12. These weights 16 slide in suitable vertical guides (not shown) and are lifted by the cams 17 on shafts 18 and allowed to drop on the rods 12 by gravity. These tappers and their actuating mechanism are similar to ordinary ore stamp mills.

As the molds and cars are simultaneously moved under the hopper 2, the tappers continuously cause the filled molds to be rapped, which causes the material to compact itself in the molds and thereby assists the heat from the kiln car in dewatering the material. After the cars carrying the filled molds pass from under the hopper, tapping is continued, and after a further movement, it is found that the briquets have become sufficiently formed so that they can be separated from the molds.

As shown herein, the molds 4 are provided on each side with rollers 19, 20, at different levels, and so arranged as to engage an inclined track 21. The molds are thus lifted vertically while progressing horizontally and because of the continued action of the tappers, separation of the briquets from the molds is hastened, both because the heat from the car has caused the material to dry and shrink, and also because of the mechanical vibration. The shaft 18 which drives the tappers is continued at an incline by means of a universal joint so as to drive all the tappers while the molds are being lifted. As shown, these tappers do not all operate at once so that a continual vibration is imparted to the material throughout the tapping zone. As shown in Fig. 1, the track 21 continues to incline upwardly until the molds 4 have been lifted far enough to clear the briquets 22. This lifting is done by reason of the molds and the cars being of the same length, and all being moved by the pusher 10. The cars carrying the briquets now pass to the transfer car 23 running on tracks 24 and are moved thereon by pusher 25. The pusher 26 moves the loaded car 5 on tracks 27 into kiln 28. When the cars come out of kiln 28 they are dumped at 29 and the empty cars are moved by pusher 30 on a transfer car 31 back to the starting point. The transfer car 31 runs on rails 32.

After the empty molds on tracks 21 have cleared the briquets, they run downwardly by gravity on a continuation thereof to mold return tracks 36 having stops 37. Tracks 21 end in hinged and counterweighted switch points 38 which drop under the weight of the mold to allow it to reach tracks 36 and then lift so that the mold can run by gravity rearwardly on tracks 36. Fig. 4 shows the elevation in detail at the rearward end of tracks 36, from which it will be seen that tracks 36 end adjacent a carrier 37 provided with continuation tracks 38 for rollers 19, and 39 for rollers 20. Carrier 37 is suspended by transversely extending inclined tracks 40 (see Fig. 5). The empty molds thus run by gravity from return tracks 36 on to the suspended carrier 37, until they strike stops 42. The weight of the mold on carrier 37 is sufficient to overcome the carrier counterweight 43, so that the carrier and mold then roll by gravity down tracks 40 until the carrier and mold come to rest immediately above the empty car 5 on transfer car 31 at the rear or left end of track 6. The empty mold in the carrier is within a fraction of an inch of the surface of the car 5 and the pusher 10 engages both the empty mold and the car and while advancing the car and the mold also discharges the mold from the carrier 37. As soon as the mold is discharged form the carrier 37, the weight 43 returns the carrier to receive the next empty mold. The operation of positioning an empty mold on a heated car in advance of hopper 2 is thus intermittently repeated, so that the process is consequently continuous.

It will be understood that the method herein described is independent of the particular apparatus shown herein for the purpose of carrying out the method, and it will be obvious that various plants may be employed in carrying out the method other than that shown. It will further be seen that while the present method is in some respects an improvement upon the method of my former patent, in other respects the method herein disclosed is independent thereof, and embodies novel features which may or may not be employed in carrying out the method of said patent.

The apparatus herein disclosed is not claimed herein, being made the subject of a separate application filed of even date herewith.

Having thus described my invention, I declare that what I claim as new and desire to secure by Letters Patent, is:—

The method of making briquets, which consists in positioning a bottomless multiple compartment mold on a support, charging wet material into said mold while on said support, heating and jarring said material while in the mold to effect an initial set of the briquet, and simultaneously jarring and lifting the mold to separate it from the briquet.

In testimony whereof I affix my signature in presence of two witnesses.

FRED ALLEN JORDAN.

Witnesses:
ELIZABETH WILSON,
J. D. MACCRALL.